Figures 1, 2:
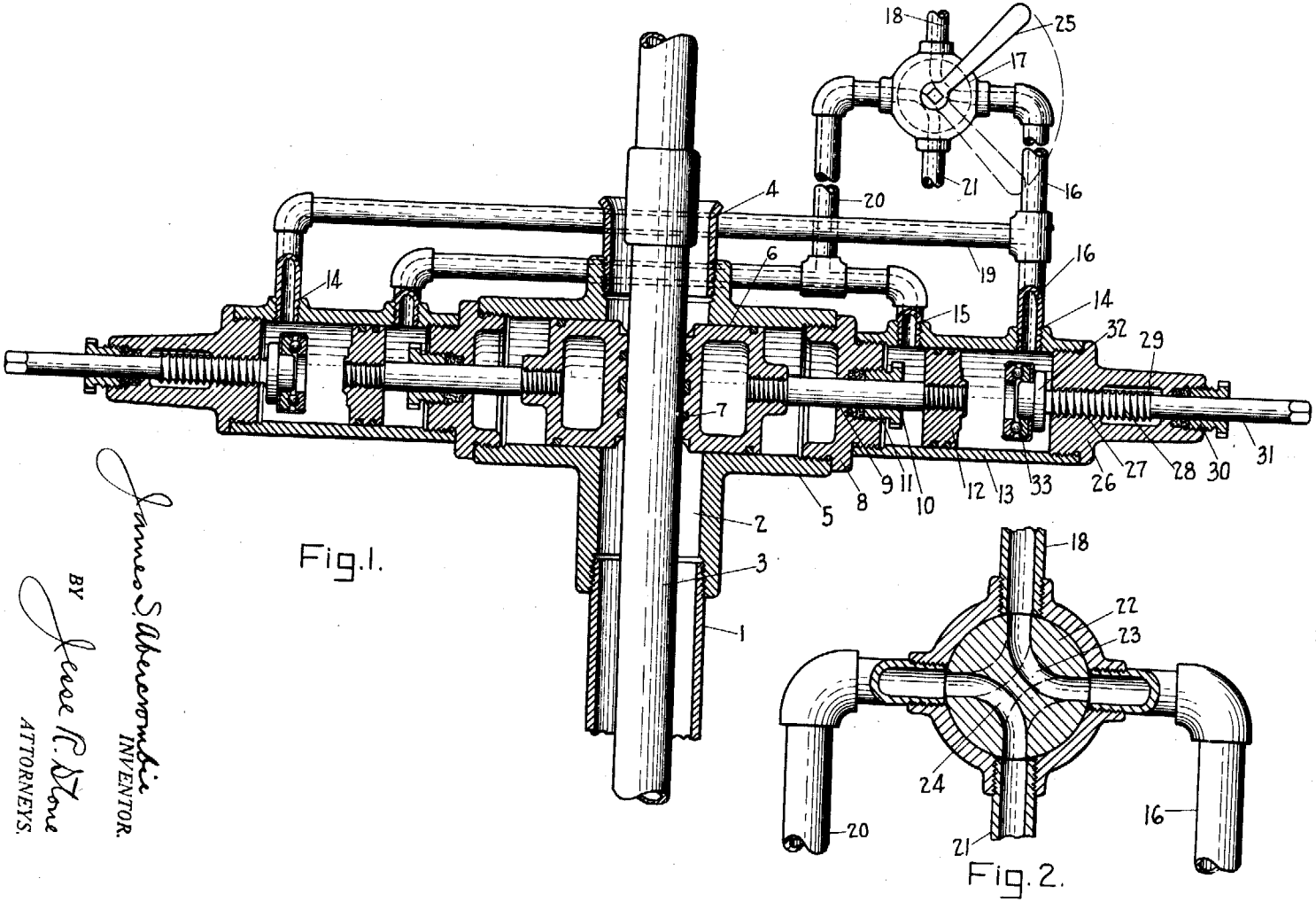

J. S. ABERCROMBIE

June 20, 1933. FLUID PRESSURE OPERATED BLOW-OUT PREVENTER Re. 18,874

Original Filed July 1, 1927

James S. Abercrombie
INVENTOR.

BY Jesse R. Stone
ATTORNEYS.

Reissued June 20, 1933

Re. 18,874

UNITED STATES PATENT OFFICE

JAMES S. ABERCROMBIE, OF HOUSTON, TEXAS

FLUID PRESSURE OPERATED BLOW OUT PREVENTER

Original No. 1,834,922, dated December 8, 1931, Serial No. 202,890, filed July 1, 1927. Application for reissue filed May 4, 1933. Serial No. 669,375.

My invention relates to an improvement in blowout preventers, such as will enable the valves of the preventer to be operated quickly in case of emergency and which is adapted to hold the valves seated.

My device is adapted to be used upon an ordinary type of blowout preventer but is particularly constructed for use on the blowout preventer shown in the prior patent taken by me jointly with H. S. Cameron, No. 1,569,247, granted January 12, 1926. This device is adapted to be secured at the upper end of a well casing and to close off the space about the drill stem in case gas pressure is encountered in drilling the well, and thus prevent the gas from blowing out.

It is an object of my invention to provide a rapidly operating means for throwing the valves in closed position immediately upon any showing that the gas is blowing from the well.

It is desired that the valves be formed and mounted so as to be operated by fluid under pressure tending to force the valves quickly into closed position from both sides of the drill stem.

It is also an object to provide a means for holding the valves in closed position after they have once been closed.

Referring to the drawing herewith Fig. 1 is a central vertical section through a blowout preventer of the character described, having my operating means secured thereon.

Fig. 2 is a vertical section through the four-way valve by means of which the fluid pressure is governed. Like characters of reference are employed to designate like parts in both the views.

In the drawing I have shown my blowout preventer as secured to the upper end of the casing 1 extending downwardly into the well. Said preventer includes a housing with a vertical passage 2 therethrough to accommodate the drill stem 3 which is employed in drilling the well. The upper end of the passage 2 may have therein a short guide nipple 4, the upper end of which is flared slightly to guide the tools into the passage through the housing. There are two oppositely extending cylinders 5 to receive the valve pistons 6.

The valve pistons 6 are cylindrical in general outline having their forward faces recessed to fit about the drill stem 3, and packing strips 7 are mounted at points on said pistons so as to make a close fit about the drill stem and with the cylinders 5 as will be seen from the drawing.

The outer ends of the cylinders 5 are closed by plugs 8 which are screwed within the housing and have a central opening 9 therethrough to receive the valve stem 10. A stuffing box 11 is formed in the outer face of the plug 8 to form a fluid tight engagement with the valve stem 10.

The outer end of the valve stem is threaded to engage with a piston 12 which is adapted to work within a cylinder 13 threaded over the outer end of the plug 8 and extending outwardly from the housing a sufficient distance to allow the proper movement of the piston 12 in the operation of the valves. The said cylinder 13 is formed with two upper ports 14 and 15. The port 14 is an inlet port to allow the inlet of steam against the outer face of the piston 12 and is threaded to receive the inlet pipe 16 connected through the four-way valve 17 with a pipe 18 leading to a source of supply of fluid under pressure, such as steam or compressed air. The pipe 16 has a branching connection 19 thereon leading to the port 14 on the opposite side of the preventer serving to operate simultaneously both valves in an obvious manner.

The port 15 on each of the cylinders 13 is connected with an outlet pipe 20 leading by way of the valve 17 to an exhaust pipe 21. The construction of the four-way valve will be understood from Fig. 2. The valve casing has a central disc 22 therein, said disc having curved passages 23 and 24, so formed as to make connection with the pipes 16 and 18 and between the pipes 20 and 21. The disc 22 has a handle 25 thereon to rotate said valve into a position where the passage 23 in the valve disc will connect the pipes 16 and 21 and further connect the passage 24 with the pipes 18 and 20. This is indicated in dotted lines in Fig. 2. It will thus be possible to allow pressure fluid to enter on either side of the piston and to also allow the exhaust of fluid from the opposite side of the piston 12.

The outer ends of the cylinders 13 are closed by plugs 26. These plugs are screwed within the outer ends of the cylinders 13 and have a threaded opening 27 on the inner end of the plug to receive a threaded shaft 28. There is a central chamber 29 in the plug to space the walls thereof away from the threaded portion of the shaft and the outer end has therein a stuffing box 30 through which the outer unthreaded end 31 of the shaft may rotate.

The forward end of the shaft 28 has a head 32 thereon and an anti-friction bearing 33 is mounted on the inner end of said head so as to bear against the piston 12 when the valves 6 are in closed position.

In the operation of this device the structure will be assembled as is shown in Fig. 1 and the valves 6 will ordinarily be in open position spaced away from the drill stem which is rotatable through the housing. If, however, the gas begins to flow from the well indicating a blowout, the operator can immediately adjust the valve 17 through the handle 25 to admit fluid pressure on the outer sides of the pistons 12, thus moving the pistons quickly into closed position, as shown in Fig. 1, tightly closing the space between the drill stem and the housing so as to prevent the escape of fluid. When the valves have been thus closed the screw shafts 28 may be moved forwardly through the rotation thereof to bring the forward ends 33 against the pistons 12 and thus exert further pressure on the pistons and to hold said pistons in closed position under pressure. The fluid may then be allowed to exhaust from the cylinder 13 and the valves thus will remain closed.

If it is desired to again open the valves the shafts 29 will be screwed into retracted position and fluid pressure may be allowed to flow through the pipe 20 on the opposite sides of the pistons and the valves may be opened.

The advantages of this construction lie in the fact that valves thus constituting the closing means about the drill stem may be operated instantaneously to prevent a blowout when an emergency arises. It is also possible from this construction to close the valves entirely with the use of screw shafts 28, but it is contemplated that the rapid closing of the valves is usually necessary and the apparatus here provided allows a closure of the valves with no delay, so that no accident can occur in allowing the escape of the gas pressure.

Having thus described my invention, what I claim as new is:

1. A blowout preventer for wells, including in combination a well casing, a housing attached thereto and having a passage therethru, adapted to admit a drill stem, complementary valve members adapted to close the opening in said housing by engaging the drill stem, pistons for operating said valve members, and a single control means for admission or emission of fluid to said pistons, whereby simultaneous operation of the valves is obtained, and auxiliary mechanical means for closing and retaining the pistons in closed position independent of the fluid pressure, and packing material carried by said valve members to form a seal about the drill stem and within said cylinder.

2. A blowout preventer for wells including a well casing, a housing thereon having an upright passage therethrough for a drill stem, complementary rams on each side of said housing shaped to engage about the drill stem, piston rods on said rams, means on said rams to form a seal with said drill stem, pistons on said piston rods, fluid pressure means to move said pistons and said rams, stems in aid housing and threaded therein to be screwed against said pistons, and antifriction means on said stems to allow relative rotation of said stems when engaged with said pistons.

3. In a blower preventer for deep wells including a well casing, and a pair of opposed rams shaped to close the space in said casing about a drill stem, the combination of fluid pressure operated means to simultaneously move both said rams to closed position, and additional means manually operated to fix said rams in closed position clamped against said drill stem.

4. In a blowout preventer for deep wells including a well casing, and a pair of opposed rams shaped to close the space in said casing about a drill stem, the combination of fluid pressure operated means to simultaneously move both said rams to closed position, and additional means manually operated to fix said rams in closed position clamped against said drill stem, said means including a shaft threaded to be advanced against said fluid pressure operated means in the manner described In testimony whereof I hereunto affix my signature this 27th day of April, 1933.

JAMES S. ABERCROMBIE.

CERTIFICATE OF CORRECTION.

Reissue No. 18,874. June 20, 1933.

JAMES S. ABERCROMBIE.

It is hereby certified that error appears in the printed specification of the above numbered patent requiring correction as follows: Page 2, line 94, claim 3, for "blower" read blowout; and that the said Letters Patent should be read with this correction therein that the same may conform to the record of the case in the Patent Office.

Signed and sealed this 11th day of September, A. D. 1934.

Leslie Frazer (Seal) Acting Commissioner of Patents.